S. B. GOLD.
INTERNAL COMBUSTION ENGINE.
APPLICATION FILED MAY 3, 1916.
1,292,309.
Patented Jan. 21, 1919.
3 SHEETS—SHEET 1.
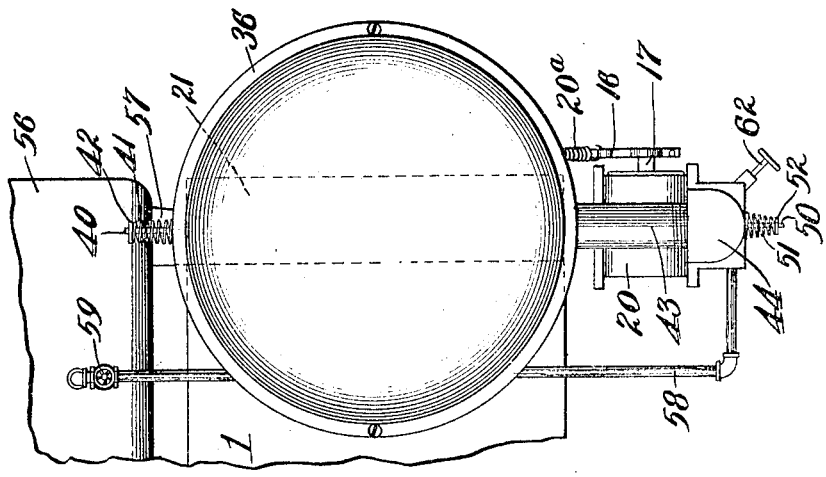
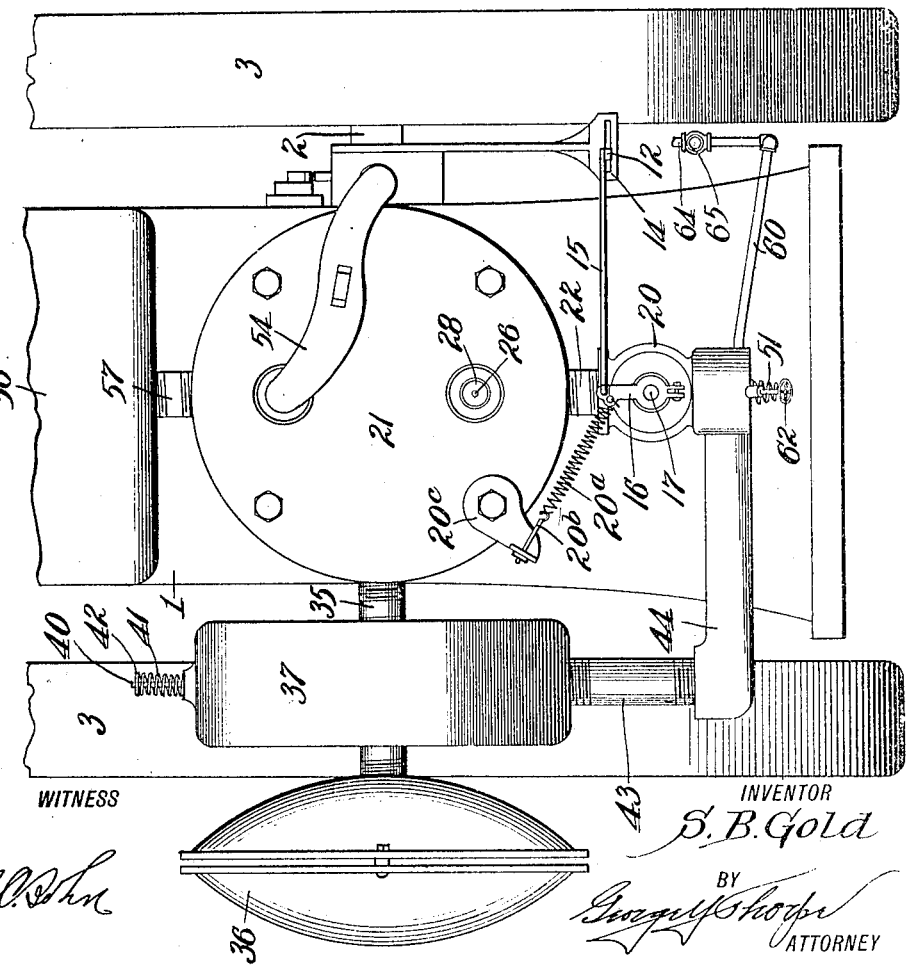

S. B. GOLD.
INTERNAL COMBUSTION ENGINE.
APPLICATION FILED MAY 3, 1916.
1,292,309.
Patented Jan. 21, 1919.
3 SHEETS—SHEET 2.
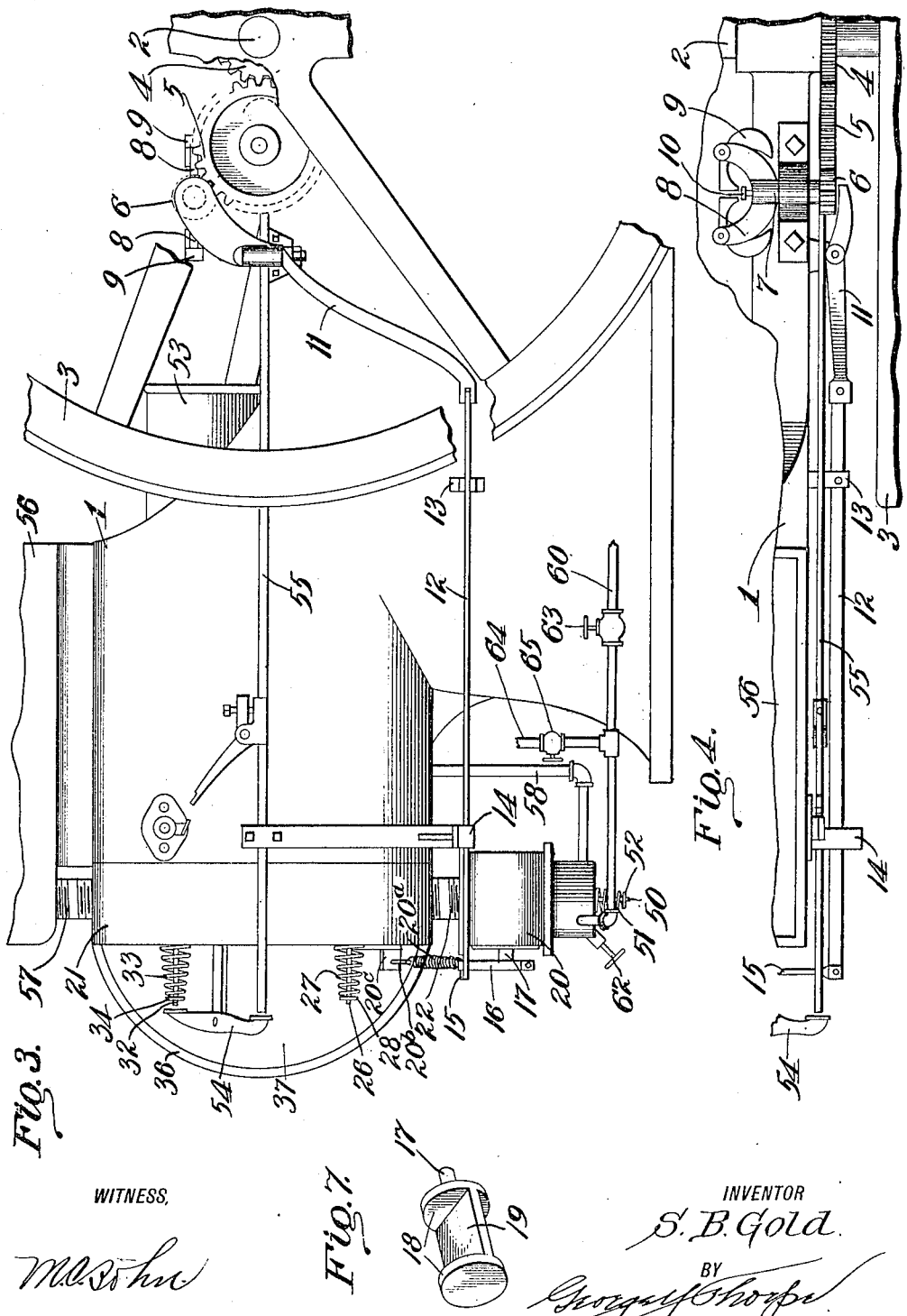
WITNESS,
INVENTOR
S. B. Gold.
BY
ATTORNEY

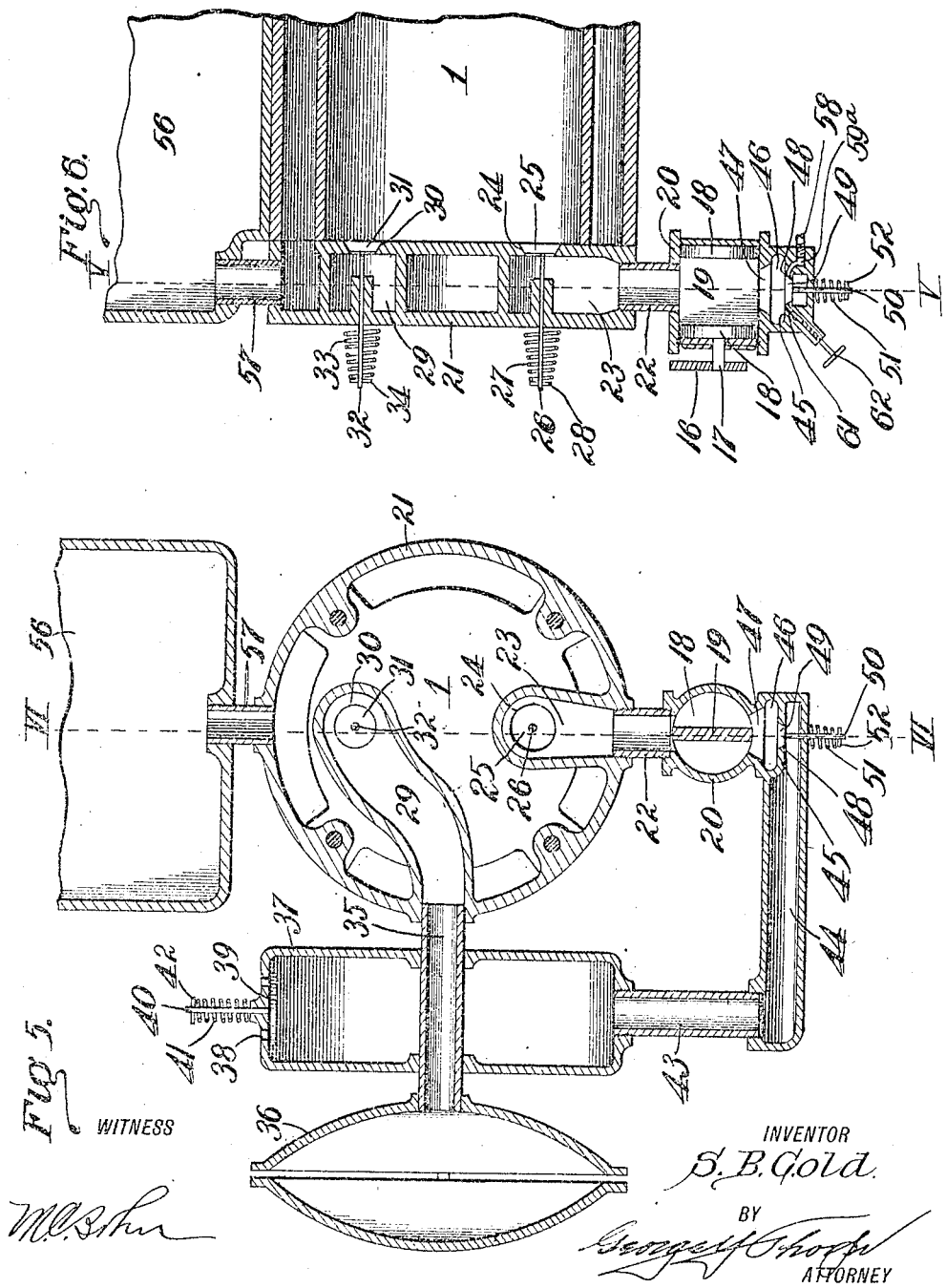

UNITED STATES PATENT OFFICE.

SAMUEL B. GOLD, OF INDEPENDENCE, MISSOURI, ASSIGNOR TO WEBER ENGINE COMPANY, OF KANSAS CITY, MISSOURI, A CORPORATION OF IOWA.

INTERNAL-COMBUSTION ENGINE.

1,292,309.   Specification of Letters Patent.   Patented Jan. 21, 1919.

Application filed May 3, 1916. Serial No. 95,734.

*To all whom it may concern:*

Be it known that I, SAMUEL B. GOLD, a citizen of the United States, residing at Independence, in the county of Jackson and State of Missouri, have invented certain new and useful Improvements in Internal-Combustion Engines, of which the following is a specification.

This invention relates to internal combustion engines and has for its object to produce an engine for efficient operation on kerosene, distillates and the like as fuel, after once being primed and started on gasolene.

Another object is to produce a throttle valve which will not flutter or vibrate through the fluctuations in the force of the suction produced in the cylinder and hence more effectually control the volume of fuel passing to the cylinder.

Another object is to provide for utilization of heat from the exhaust gases for raising the temperature of air and water if desired, preliminary to the mixture thereof with liquid fuel to effect a very thorough vaporization of the fuel.

Another object is to produce an engine in which the combustible mixture shall be expanded and compressed between the point of union of the air, water and liquid fuel and to effect a more intimate mixture of such elements.

Another object is to produce a spring-opened throttle valve and efficient connections whereby the governor of the engine shall impart closing movement to said valve in the event the speed of the engine grows excessive, the spring-actuated throttle reopening as the speed of the engine diminishes.

With these and other objects in view, the invention consists in certain novel and peculiar features of construction and combinations of parts as hereinafter described and claimed; and in order that it may be fully understood reference is to be had to the accompanying drawings, in which:—

Figure 1, is a fragmentary front view of an engine embodying my invention.

Fig. 2, is a side view of a part of the engine.

Fig. 3, is a fragmentary view of the opposite side of the engine.

Fig. 4, is a fragmentary plan view of the engine to show certain features of construction illustrated by Fig. 3.

Fig. 5, is a transverse section of the engine on the line V—V of Fig. 6.

Fig. 6, is a section on the line VI—VI of Fig. 5.

Fig. 7, is a detailed perspective view of the throttle valve.

In the said drawings, 1 is an engine of conventional form and 2 the crank shaft and 3 fly wheels thereof.

4 is a gear pinion on the crank shaft meshing with a suitably journaled gear wheel 5 enmeshed with a small gear 6, having a hub portion 7 suitably journaled on the engine frame. The hub 7 is provided with diametrically opposite ears 8 in which are pivoted angle levers 9 weighted at their outer ends and constituting the governor of the engine. The inner ends of the angle levers are adapted as the outer ends swing outward through centrifugal power under the rotation of wheel 6, to press against the inner end of a spindle 10 extending through said wheel and its hub to operate a rocker lever 11 mounted on a vertical pivot supported from the engine frame. The opposite or lower end of the lever 11 is pivoted to rock lever 12 pivoted on a bearing bracket 13, projecting from the engine frame, and said lever 12 near its front end is adapted to operate in a horizontally slotted guide bracket 14 suitably secured to the engine frame.

The front end of the rock lever 12 is pivotally connected by a link 15 with a crank arm 16 on the stem 17 of a rotary throttle valve, said valve comprising end disks 18 connected by a diametric web 19. The throttle valve is mounted in a valve casing 20 and is held normally in open position, viz. with its web 19 disposed vertically see Fig. 5, by a retractile spring 20$^a$ connected at its opposite ends to the crank arm 16 and to an adjustable hook 20$^b$ extending through a bracket 20$^c$ secured to a hollow head 21, mounted at the front end of the cylinder of the engine.

22 is a short tube extending from the valve casing 20 to a passage 23 leading to an opening 24 in the head of the cylinder, which opening is normally closed by an intake valve 25 as shown most clearly in Fig. 6. The valve 25 is provided with a stem 26 extending through the front wall of the head and is held normally closed by a helical spring 27 surrounding said stem and bearing at its opposite ends against said head and a collar 28 secured to the said stem.

29 is an exhaust gas passage extending from one side of the hollow head to an opening 30 in the front end of the cylinder and said opening is controlled by the exhaust valve 31 having a stem 32 extending through and beyond the front wall of said head, a helical spring 33 bearing against said head and collar 34, secured to the valve stem for normally holding the valve in closed position.

The outer end of the exhaust gas passage 29 is connected by a short tube 35 with a muffler 36 of conventional type, that shown comprising a pair of spaced bowed disks arranged with their hollow sides facing.

37 is an air chamber or drum mounted on the short pipe 35 between the head and the muffler so that heat radiating from pipe 35 within said chamber or drum shall raise the temperature of the air passing through the latter.

The drum is provided at its upper side with air inlet openings 38 normally closed by a valve 39 having a stem 40 extending upward through the wall of the drum, a spring 41 surrounding said stem and bearing at its opposite ends against the drum and the collar 42 on said stem and tending to hold the valve seated except when the power of said spring is overcome by suctional action produced in the engine cylinder, under which suctional power the valve opens to admit air to the drum.

The drum is connected by a short tube 43 with a transverse tube 44 formed integral by preference, with the valve casing and below the latter, tube 44 is provided with a partition 45 to provide an expanding chamber 46 between the tube 44 and the chamber of the casing 20 containing the valve, the lower wall of said casing having a central opening 47 of smaller diameter than the chamber 46 so that combustible gases, as hereinafter explained, passing from said chamber into the valve casing shall be caused to enter the valve casing at slightly accelerated speed and in a concentric or upwardly tapering path so that through impingement against the throttle valve a more thorough mixture may be secured. The partition is provided with a central valve opening 48, normally closed by a valve 49 having a stem 50, extending downwardly through and beyond the lower wall of tube 44, a spring 51 bearing against said wall of the tube and a collar 52 on said valve stem to hold the valve yieldingly closed.

When suction is produced in the cylinder by backward movement of the piston 53, the valves 25, 49 and 39 are unseated to open up communication between the atmosphere and tube 44 to the cylinder and when the exhaust valve is opened under pressure applied by rock lever 54 actuated by guide rod 55, reciprocated by the customary eccentric, not shown, the burned gases are forced by the advancing piston through opening 30, passage 29, and tube 35 into the muffler, these gases heating the tube 35 and the drum 37 by conduction and radiation as hereinbefore mentioned.

Mounted upon the cylinder of the engine is a water receptacle 56 connected at its front end by a downwardly extending pipe 57 with the interior of the hollow head 21, and then as customary with the chamber of the water jacket inclosing the cylinder for the purpose of keeping the engine as cool as possible.

58 is a pipe controlled by a valve 59, connecting the water receptacle 56 with the valve opening 48 in the partition 45 for supplying water as well as air for mixture with the kerosene or other fuel employed, the kerosene being supplied from a suitable receptacle, not shown, through a pipe 60 communicating with the passage 61 leading to the valve opening in partition 45, and controlling said liquid fuel supply passage is a needle valve 62. The pipe 60 is provided with a controlling valve 63 and the needle valve has a pipe 64 leading from the customary gasolene supply, not shown, for priming purposes, said pipe 64 being controlled by a valve 65.

To start the engine, which of course will be equipped with suitable ignition devices, not shown, the valve 65 is opened to admit sufficient gasolene, at the partition 45. The engine is then cranked in any suitable manner to produce suction for drawing a charge of gasolene and air into the mixing and expanding chamber 46, where it has an opportunity to expand. It is drawn from said chamber up through opening 47, which being smaller than the chamber tends to accelerate the flow of the air and gas and therefore more intimately mix the same, as heretofore stated. It is then drawn up through the throttle valve chamber and the connections described into the cylinder, the suction atomizing the fuel so that the same with the air shall produce an explosive mixture, this mixture being compressed by the ensuing forward movement of the piston. As it is fully compressed, the ignition apparatus explodes it. Subsequent similar actions correspond to those described, it being understood that if valve 59 is opened water will mix with the air and fuel and be vaporized therewith, the speed of the governor determining the volume of the entire mixture passing to the cylinder.

After the engine has been running for a short time, the valve 65 is closed and valve 63 opened to supply kerosene or the like instead of gasolene, it being understood that the exhaust gases discharged in every alternate forward movement of the piston raise the temperature of the air for the purpose of facilitating the vaporization of the kerosene or other low grade liquid fuel.

The spring 20ª is positioned to hold the valve 19 normally in fully opened position as indicated in Fig. 5, but should the engine start to race, the governor, will, through the connections described, overcome the resistance of said spring 20ª and effect closing movement of the valve for the purpose of cutting down the supply of fuel and thus reducing the speed of operation. As the speed falls the spring 20ª stretched through the action of the governor, retracts to impart reopening movement to the valve, it being noted in this connection that the valve is of such form and has such extended bearings through the peripheral contact of the disks with the valve casing that the valve movement is steady and continuous in either direction and does not flutter as in the ordinary type of butterfly valve. It will be seen that the construction described provides means whereby the supply of combustible mixture is gradually increased or diminished through the action of the governor mechanism and not spasmodically supplied as is the case where a valve is employed which is capable of fluttering. I have found that by the use of a valve of this character the speed of the engine can be controlled much more effectually than by the use of a valve which would flutter or vibrate and permit the combustible mixture to pass to the cylinder in variable volume as long as the valve occupies any position between its fully closed or fully opened positions.

From the above description it will be apparent that I have produced an internal combustion engine possessing the features of advantage enumerated as desirable in the statement of the object of the invention, and I wish it to be understood that while I have illustrated and described the preferred embodiment of the invention, I reserve the right to make all changes falling within the spirit and scope of the appended claim.

I claim:

The combination in a gas engine, of an intake pipe provided with a cylindrical valve casing disposed at right angles with the intake pipe and communicating at its upper side with said pipe and provided in its lower side with a mixing chamber and a communicating opening leading from and of smaller diameter than the mixing chamber and said casing, means for admitting gas and air to the mixing chamber, a valve journaled in the casing and comprising circular ends, a central web connecting the ends and a central stem projecting from one of the ends through the casing wall, a lever secured on said stem, a retractile spring connected to said lever for yieldingly opening the valve, a lever actuated from the governor of the engine, and a link pivotally connecting said lever with the first-named lever for imparting closing movement to the valve.

In testimony whereof I affix my signature.

SAMUEL B. GOLD.

Copies of this patent may be obtained for five cents each, by addressing the "Commissioner of Patents, Washington, D. C."